United States Patent [19]

Wormser et al.

[11] 4,329,978

[45] May 18, 1982

[54] SOLAR ENERGY DEVICES

[76] Inventors: Eric M. Wormser, 88 Foxwood Rd.; Carl R. Mezoff, 81A Rippowam Rd., both of Stamford, Conn. 06902

[21] Appl. No.: 29,732

[22] Filed: Apr. 13, 1979

[51] Int. Cl.³ .............................................. F24J 3/02
[52] U.S. Cl. ................................. 126/417; 126/424; 126/438; 126/439; 126/452; 350/320
[58] Field of Search ............... 126/438, 439, 424, 425, 126/417, 450, 452; 350/320, 288

[56] References Cited

U.S. PATENT DOCUMENTS

| | | | |
|---|---|---|---|
| 3,841,302 | 10/1974 | Falbel | 126/439 |
| 3,923,039 | 12/1975 | Falbel | 126/424 |
| 4,016,861 | 4/1977 | Taylor | 126/438 X |
| 4,020,827 | 5/1977 | Broberg | 126/438 |
| 4,084,578 | 4/1978 | Ishibashi | 126/437 X |
| 4,120,282 | 10/1978 | Espg | 126/438 |
| 4,196,720 | 4/1980 | Eldifrawi et al. | 126/438 |

FOREIGN PATENT DOCUMENTS 600260  6/1978  Switzerland ...................... 126/438

*Primary Examiner*—Larry Jones
*Attorney, Agent, or Firm*—William G. Rhines

[57] ABSTRACT

This invention relates to solar collectors of the type having associated reflectors to increase their efficiency, and includes a method of establishing the orientation of the collector with respect to the sun such that the unit may be operated at a high level of efficiency with only a semi-annual adjustment in the angular positioning of the reflector with respect to the collector.

10 Claims, 11 Drawing Figures

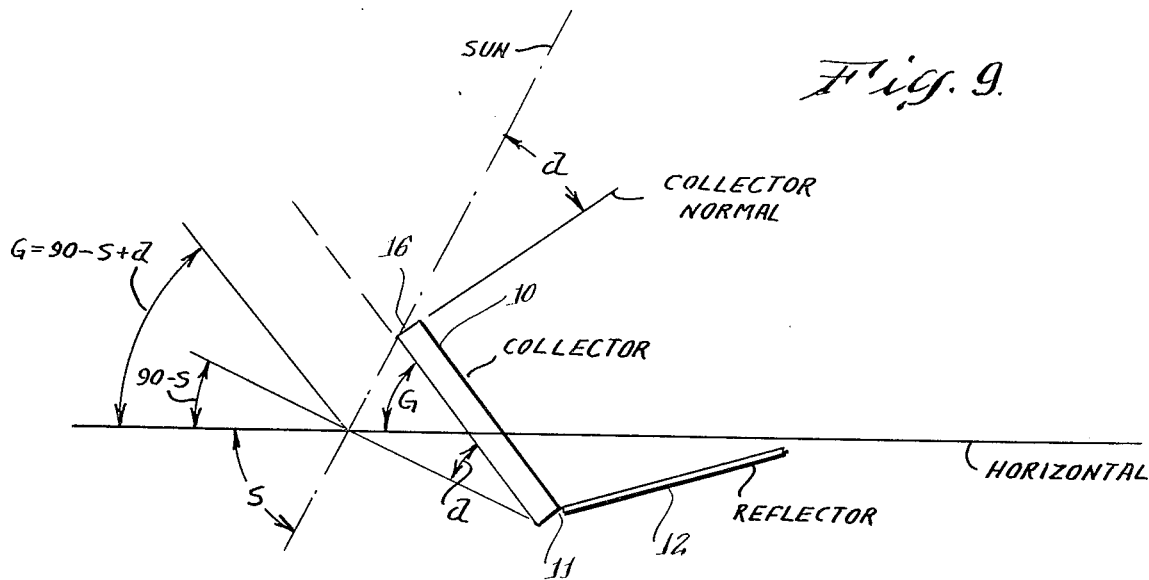
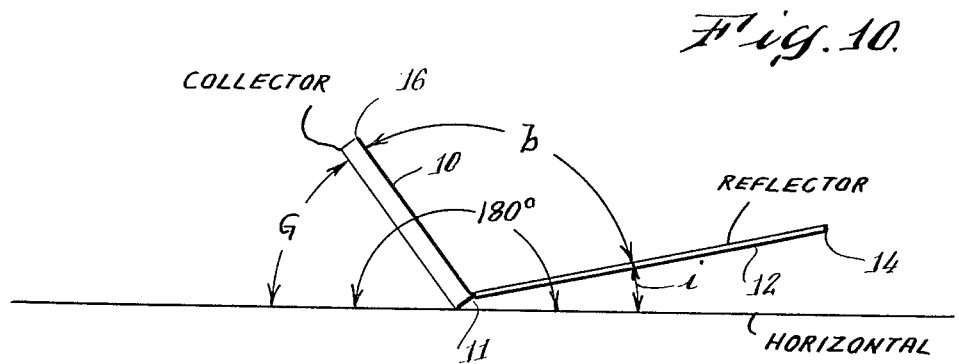
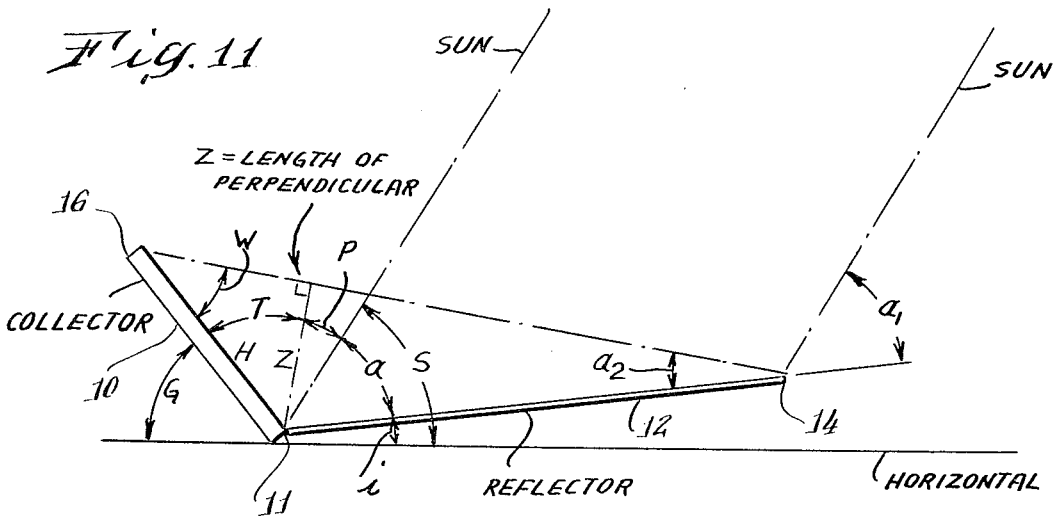

SOLAR ENERGY DEVICES

BACKGROUND OF THE INVENTION

In the field of solar energy collector devices, it is known to use associated reflector devices of a wide variety of geometric configurations to increase the efficiency of use of the collector by re-directing additional rays of the sun to the collector. In this connection, reference is made to the following U.S. Pat. Nos.: 3,884,217; 3,923,039; 1,696,003; 1,946,184; 2,467,885; 2,688,923; 2,872,915; 2,906,257; 2,969,783; 3,052,229; 3,270,739; 629,122; 4,038,971; 4,015,585; 4,038,972; 3,994,435; and 3,946,721. It is also known to use a flat planar collector that may be directed toward the sun, with an associated flat planar mirror hinged thereto so as to form an angle thereto when the reflector is being utilized in the reflective mode and to form a protective cover for the collector, as when the collector is not in use, or is subject to foul weather, or is subject to overheating, as in summer. In this connection, reference is made to U.S. Pat. No. 3,254,643.

While such prior art devices have desirable features insofar as enhancing the utilization of solar collection, until now the methods and apparatus disclosed have not been directed toward making it possible to realize substantially the maximum energy collection benefits obtainable while, at the same time, accomodating the practical fact that for most domestic and commercial installation, it is not feasible for intricate or too frequent adjustments to be made in the positioning of the various elements of the device. Thus, as solar energy devices are becoming more popular in installations for heating residential and commercial buildings, changes in reflector position more often than a few times a year frequently do not get made, resulting in relatively inefficient utilization of the equipment. The alternative of intricate and expensive machinery to accomplish this end, such as mechanized tracking devices, have proven not to be commercially feasible for this purpose. But, not to make such changes results in relatively inefficient utilization of the installation.

Accordingly, it is an object of this invention to provide means for the effective utilization of reflector augmented solar collector devices.

Another object of this invention is to provide such means for achieving the foregoing objective involving infrequent adjustments to effect optimal benefits from the collector-reflector installation.

Still another object of this invention is to provide such means for achieving the foregoing objectives in a manner which is simple to understand and to carry out.

An additional object of the invention is to provide such means wherein the reflector may also be used effectively as a complete shutter for all or part of the collector area to protect it from overheating when fluid is not being circulated or heat energy is not required, or to conveniently reduce or adjust the input to multi-collector arrays solar systems when the collecting area of the solar array is in excess of the heating or cooling requirements.

SUMMARY OF INVENTION

Desired objectives may be achieved through practice of the present invention, embodiments of which include a method for angularly positioning a solar collector and an associated reflector hinged to it, with respect to each other and to the sun, having the steps of positioning the collector at a desired angle with respect to horizontal, angularly positioning the reflector with respect to the collector in accordance with a geometric formula by which the preponderance of sun's rays impinging upon the reflector during one season of the year will be re-directed to the collector and will impinge upon the latter at an angle which enhances absorption of reflected energy by the solar collector at a high rate, and so repositioning the reflector at one or more other seasons that the preponderance of the sun's rays coming to the outermost end of the reflector are re-directed to the top of the collector.

This invention may be understood from the text herein and from the accompanying drawings in which FIG. 1 depicts an embodiment of this invention, FIG. 2 is another depiction of the embodiment of the invention shown in FIG. 1, FIG. 3 is still another depiction of the embodiment of the invention shown in FIGS. 1 and 2, FIG. 4 is yet another depiction of the embodiment of the invention shown in FIGS. 1, 2, and 3, FIGS. 5, 6, 7, and 8 depict curves of data relating to embodiments of the present invention, and FIGS. 9, 10, and 11 are other depictions of an embodiment of this invention.

DESCRIPTION OF PREFERRED EMBODIMENTS

Figure 1:
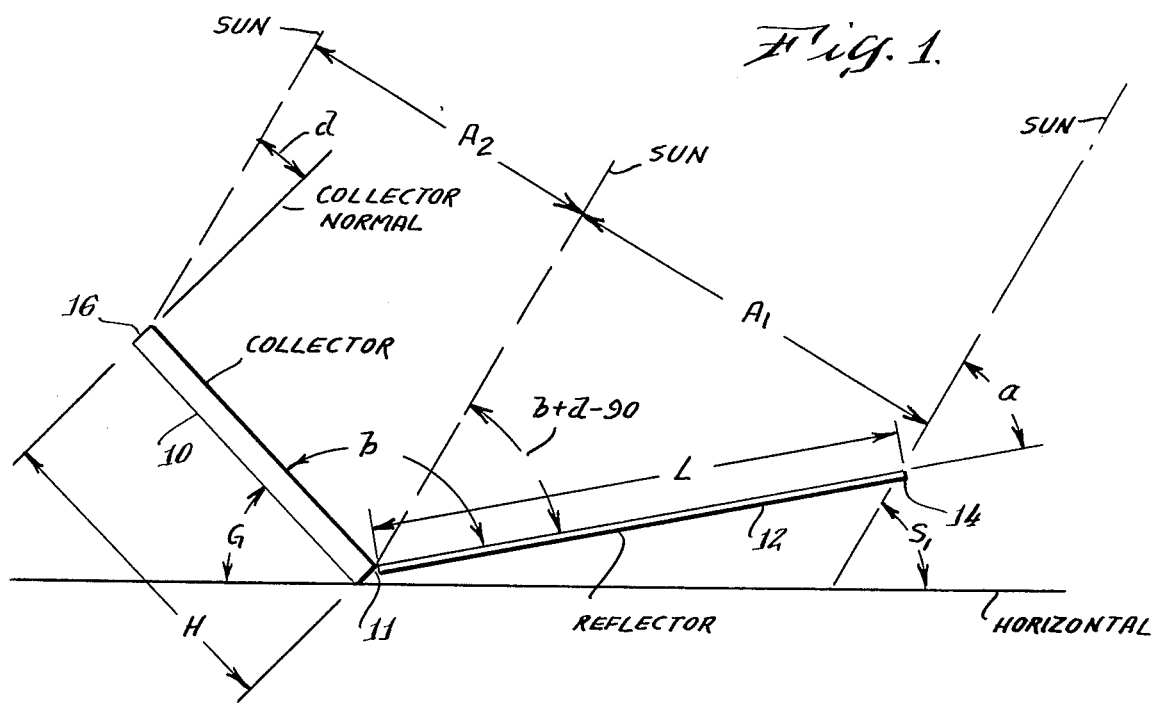

Referring first to FIG. 1, there is depicted an installation which includes a flat plate solar collector panel 10 which may be of known per se design and construction and of a desired height H, and is to be positioned with respect to horizontal at an angle G, derived in a manner hereinafter described. FIG. 1 also shows the "collector normal" line, i.e., a reference line drawn at right angles to the plane of the collector 10. The collector is oriented, according to known per se engineering principles, to a desired facing with respect to the sun. Thus, it may be given an azimuth direction which is south-facing, or slightly to the west of south, and, as will presently be seen, placement such that the collector normal is slightly below the sun's altitude on the "design date". By "design date" is meant the date selected for optimum energy collection for purposes of the intended utilization of the collected energy. For example, if the primary objective is to collect energy for heating in winter in northern latitudes, one might design around a date near Dec. 21. This type of selection has been found to provide most efficient utilization of collector devices over a time period. As will be seen presently, and as is apparent from FIGS. 2 and 3, a flat planar reflector, typically of commercial quality and having a high reflectivity of approximately 80% or better, may be pivotally affixed near the lower edge of the collector 10 by means of a hinge 11. The hinge means while generally in the region of the lower edge of the collector and the innermost edge of the reflector, may be at their actual edges or close to them. Alternatively, the two may be supported and moveable so as to move with respect to each other as if they were hinged without actually being joined together by a hinge per se. Thereby, the angle between the collector 10 and the reflector 12 may be varied, with the reflector remaining at substantially the same general orientation with respect to the path of travel of the sun along the horizon as does the collector 10. From the further description which follows, it will be apparent that it may be advantageous to provide legs, brackets, or other support means by which the reflector may be quickly, easily and accurately positioned at the desired established angles for the various settings utilized during the course of the year. For example, a two-position apparatus might have legs affixed to the outer end of the reflector which can tuck up under the reflector when it is in the lowered position, and can swing down to support the reflector when the reflector is in a raised position.

In establishing the angle G at which the collector 10 is positioned with respect to the horizon, consideration is first given to the purpose to which the solar energy so collected is to be utilized. Thus, for example, if it is to be used for winter heating, the collector will be positioned so as to optimize its effectiveness in mid-winter as the highest load period, according to known per se engineering principles. Assuming that objective for purposes of illustration, and taking the period over which the winter setting is to obtain as being the months of October through February inclusive, a chart may be made of the sun's angle with respect to horizontal, on average for each month or other convenient incremental time span, at a desired time each day during the period. Experience has taught that for winter heating, the sun's angle at about 11 o'clock rather than at noon is most desirable because, the selection of the 11 o'clock position provides two "pass-through" incidents each day (at 11 A.M. and again at 1 P.M.). Based on these data, a sun ray angle "S", may be established, for the season in question, to provide a basis for positioning the other operative apparatus as hereinafter described, by taking the average of such angles over a selected portion of the entire (October through February, in this instance) seasonal period.

Utilizing such data, an analysis may be made to determine the maximum "aperture" which may be provided by the collector and reflector when the two are positioned at points along a range of angles with respect to each other and to the sun. In this context, "aperture" means the effective area of the receptive area of the collector, plus the portion of the reflector which effectively reflects energy to the collector, measured in a plane normal to the sun's rays. From data so collected, curves may be drawn based on aperture relative to collector and reflector size, and the reflector-collector angle, for various angles of incidence of the sun of the collector.

The collector may be positioned with respect to horizontal so as to accomodate the greatest load demand in the most optimal fashion commensurate with not being or having to be angularly variable.

Figure 2:
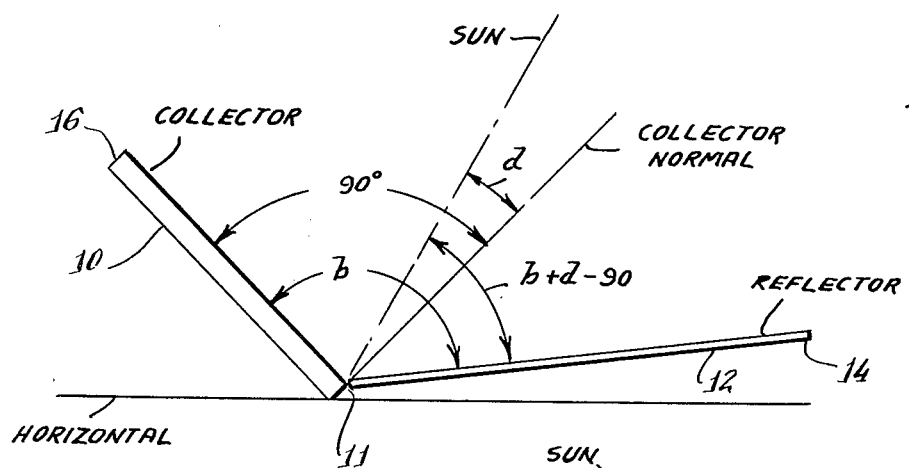

Next, and referring particularly to FIG. 2, the reflector 12 may be positioned with respect angularly to the now fixed collector in such a fashion that the optimum amount of sun will be reflected from the outermost end 14 of the reflector 12 to the topmost part 16 of the collector 10. Empirical analysis, by drawing of a number of positional combinations is used so that the angle B, of the reflector 12 with respect to the collector 10 may be determined as hereinafter described.

In summary then, with the angles of the collector so determined with respect to horizontal, and with the angle of the reflector so determined with respect to the collector, the collection capability of the unit will have been optimized on an average basis for the chosen season.

Figure 3:
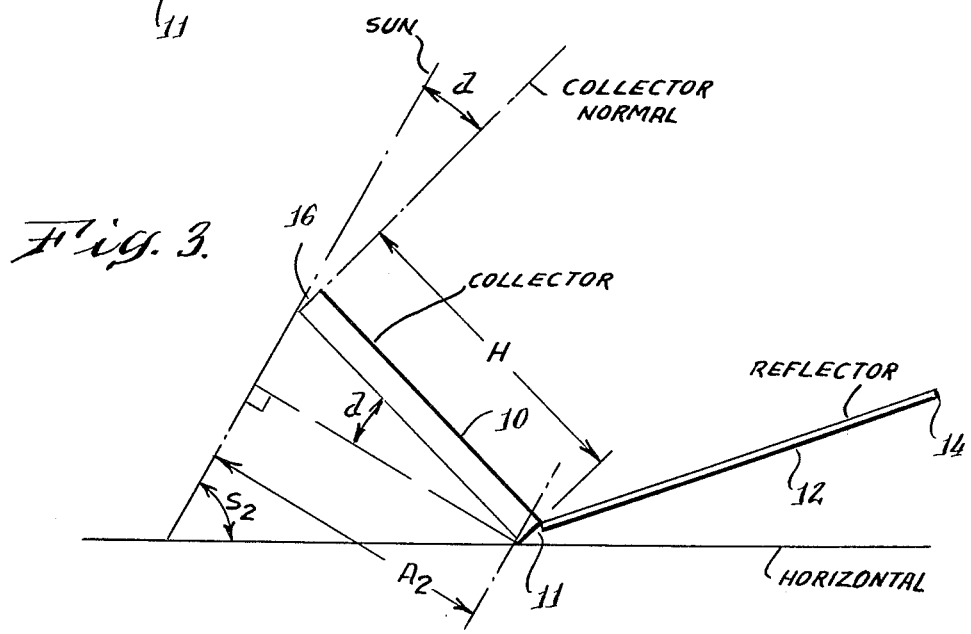

As seasonal changes occur, (e.g., in the present example, as Spring comes and Summer approaches), this optimization will no longer obtain. However, as is shown in FIG. 3, the change may be accomodated by calculating a new sun ray angle $S_2$ utilizing the principles and techniques herein set forth, for another time span (e.g., the Summer season), and based on it, the reflector 12 may be set at a new angle with respect to the collector 10. By this means, the sun's rays impinging on the end 14 of the reflector 12 at the ray angle $S_2$ will be redirected to the end 16 of the collector 10. The new angle b is established to provide the maximum aperture for the collector-reflector combination for the new (Summer) season selected, thus maximizing energy collection for that season. Further, it will be clear that a very desirable and practical working compromise is struck between (on the one hand) high average efficiency and (on the other hand) not having to make positional changes more than a few times each year in order to achieve such efficiency.

The exact method for determining the various positional relationships between the structural elements as described, and the process by which that method was derived, may be understood from the description which follows.

Figure 4:
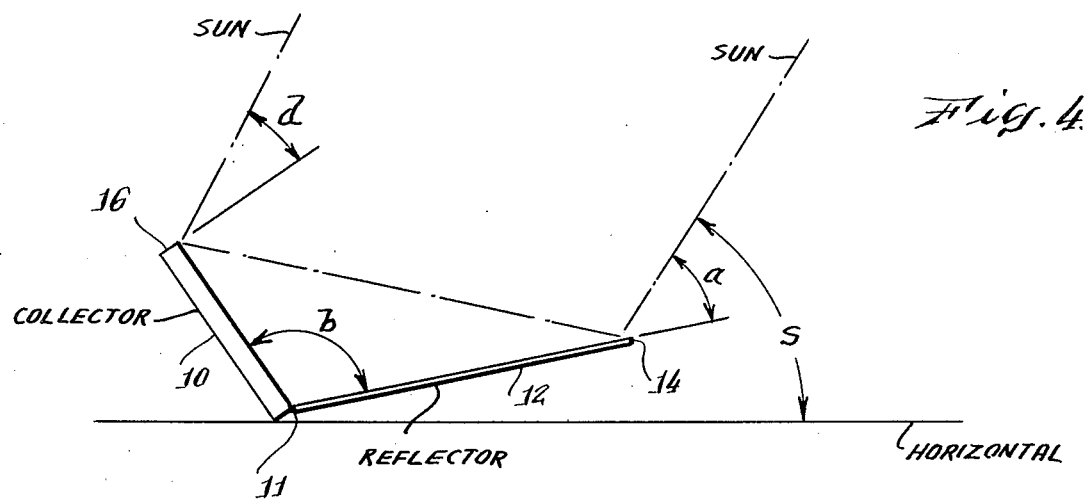

It was found, from a large number of ray tracing plots, that for any combination of collectors and reflector lengths, there is an equation relating the angle of incidence, d, and the interior angle, b, between the collector and reflector when reflector is in the optimum position. These relationships are illustrated in FIG. 4. As used herein "The optimum position" is taken to mean that position which causes a sun ray at angle S, striking the outermost edge 14 of the reflector 12, to be reflected to hit the top edge 16 of the collector 10.

Figure 5:
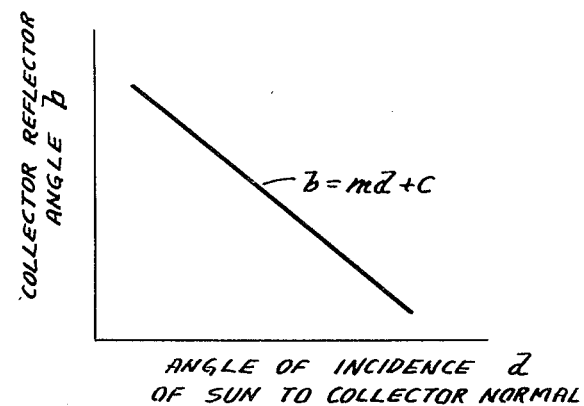

This equation is of the form, $$b = md + c$$

where d is the angle of incidence of the sun ray to the collector normal, b is the interior angle between collector and reflector, m is the slope of the line, and c is the y-intercept. The relationship of the elements of this equation is graphed in FIG. 5.

Figure 6:
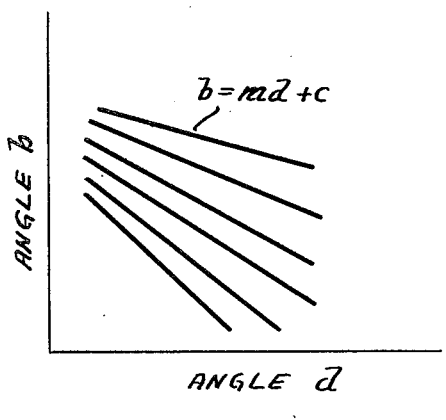

For each ratio of reflector to collector lengths, L/H, a different line was obtained, as shown graphically in FIG. 6.

Figure 7:
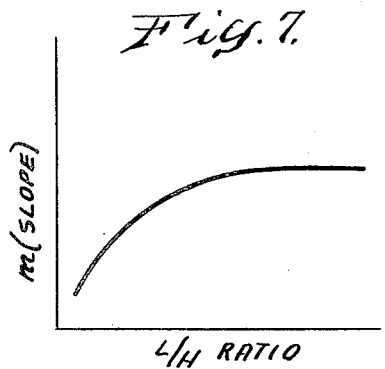
Figure 8:
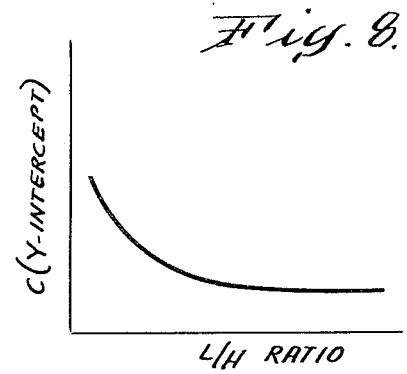

From this family of curves, new relationships were derived of "m" and "c" to the L/H ratio which may be plotted as shown in FIGS. 7 and 8 respectively.

The slope, m, of each and the y-intercept of each was plotted against the L/H ratio, and the y-intercept curve was found to be in accordance with the equation, $$c = 90\left[\frac{x+3}{x+2}\right]$$

where x is the L/H ratio; and the slope curve was found to be the equation, $$m = -\left[\frac{x+1}{x+2}\right]$$

where x is again the L/H ratio.

Putting this information together, the general interior angle, b, equation is then, $$b = -\left[\frac{x+1}{x+2}\right]d + 90\left[\frac{x+3}{x+2}\right]$$

or $$b = -\left[\frac{\frac{L}{H}+1}{\frac{L}{H}+2}\right]d + 90\left[\frac{\frac{L}{H}+3}{\frac{L}{H}+2}\right] \quad \text{Equation 3.0}$$

for any ratio of L to H.

From FIGS. 1 and 2, it can be seen that the aperture of the system may be expressed in terms of L, H, b, and d, according to the following equation:

$$A_1 = L \sin[b+d-90°]$$

Since the energy received from the reflector is controlled by the specular reflectance, R, of the reflector, this aperture can be "reduced" or adjusted to, $$A_1 \text{ effective} = RL \sin(b+d-90)$$

In the same way, from FIG. 3, $A_2$, the collector aperture is $$A_2 = H \cos d.$$

Thus, the entire expression becomes $A_t$ (total effective aperture) is $$A_t = RL \sin(b+d-90) + H \cos d.$$

Substitution for b (Equation 3.0) yields, $$A_t = RL \sin\left[d\left(1 - \frac{\frac{L}{H}+1}{\frac{L}{H}+2}\right) + 90\left(\frac{\frac{L}{H}+3}{\frac{L}{H}+2}\right) - 90\right] + H \cos d \quad \text{Equation 1.0}$$

When $A_t$ is maximized, the first derivative of this expression is O, and d is the optimum value.

By geometry we obtain $$G = 90 - S + d \quad \text{Equation 2.0}$$

the elements of which, insofar as they relate to structural embodiments of this invention, are as shown in FIG. 9.

By geometry we also obtain i, $$i = 180 - G - b \quad \text{Equation 4.0}$$

shown graphically in FIG. 10.

The equation for finding the reflector angle with a fixed collector is obtained from trigonometric relations as shown in FIG. 11, in accordance with the following:

$$a_1 = a_2 = a$$

$$Z = L \sin a$$
ti $Z = H \sin w$ so $$L \sin a = H \sin w$$

$$p = 90 - 2a$$

$$T = 180 - [G + P + S]$$
$$\quad + 90 - G - S + 2a$$

$$W = 90 - T$$
$$\quad = G + S - 2a$$

so $$L \sin a = H \sin[G+S-2a] \quad \text{Equation 5.0}$$

and $$i = S - a \quad \text{Equation 6.0}$$

From the foregoing description, it will be apparent that it is possible, through practice of this invention, to establish relationships by which the optimum angles may be determined for the positional relationships between the sun, a collector, and an associated flat reflector. It will also be apparent that the aforesaid equations may also be used to position the reflector for more than two seasons of the year (e.g., in 3 positions for 4 seasons of the solar year, the positions for Spring and Fall being the same).

Beginning only with the sun altitude angle, averaged over a given time span (e.g., October through February), the singular relationship of the collector to horizontal, and of the reflector to the collector, to produce maximum solar energy collection on a "seasonally averaged" and "daily averaged", may be established. In effect, for reasons of practical structural considerations which dictate against an angularly alterable collector, this fixes the collector at an angle with respect to horizontal. Therefore, to accomodate the fact that the sun's angle will be different when "seasonally averaged" and "daily averaged" for a time span (e.g., March through September) other than the one for which the collector was originally positioned, a new reflector angle may be established which will maximize energy collection over the second time span without changing the angular disposition of the collector with respect to horizontal.

Further, from the foregoing, it will be seen that the method of this invention, which is hereinafter expressed algebraically, may be utilized, including in computers, to establish the desired positional relationships of collectors and reflectors of any dimensions, utilizing reflectors of varying reflectance.

The method is summarized in accordance with the following, in which

A—Vertical aperture of collector and reflector, corrected for reflector reflectivity
R—Reflector reflectivity
L—Length of Reflector
H—Vertical height of collector
d—angle of incidence of selected sun ray to collector surface, measured from the collector normal
G—Collector angle with the horizontal S—Sun ray altitude angle, measured from horizontal, where $S_1$-S for a first selected time span, and $S_2$-S for a second selected time span i—Angle of reflector from horizontal a—Angle between sun ray, S, and reflector surface b—Interior angle between collector and reflector First, $S_1$ is determined for the desired "seasonal average" and "daily average" position of a selected first time span. Effectively, this is a "given" value, according to known per se principles in the solar engineering field. The values of H, L and R also being "given", as a function of structural considerations, space and materials availability and characteristics, and desired energy output needs.

From these, the angle "d", the angular disposition between the sun ray altitude angle $S_1$ and the collector normal, which gives the maximum vertical aperture A, may be found using the following equation, and substituting into it various values of "d" to determine that value for "d" which produces the highest value for "A":

$$A = RL \sin\left[ d\left(1 - \frac{\frac{L}{H} + 1}{\frac{L}{H} + 2}\right) + 90\left(\frac{\frac{L}{H} + 3}{\frac{L}{H} + 2}\right) - 90 \right] + H \cos d \qquad \text{Equation 1.0}$$

Next, the angle G between the collector and horizontal is established by solution of the formula $$G = 90 - S_1 + d \qquad \text{Equation 2.0}$$

The interior angle "b" between collector and reflector is calculated in accordance with $$b = 90\left[\frac{\frac{L}{H} + 3}{\frac{L}{H} + 2}\right] - d\left[\frac{\frac{L}{H} + 1}{\frac{L}{H} + 2}\right] \qquad \text{Equation 3.0}$$

If desired, the inclination angle "i" of the reflector from horizontal may also be established, according to $$i = 180 - G - b \qquad \text{Equation 4.0}$$

Finally, with a now fixed collector position, a second reflector position may be found for maximizing collection with respect to a second sun ray, $S_2$, by adjusting the angular disposition of the reflector with respect to the collector such that the angle "a" of the sun ray with respect to the reflector is given by $$H \sin [G + S_2 - 2a] = L \sin a \qquad \text{Equation 5.0}$$

The inclination angle "i" of the reflector with respect to the horizontal may then be determined by solving $$i = S_2 - a \qquad \text{Equation 6.0}$$

From the foregoing, it will be clear that in addition to providing means by which the collecting effectiveness or radiant energy apparatus may be optimized, this invention also provides means by which the collector may be partially or totally shut down when desired. Thus, for example, it may be desired during the middle of summer season for a solar energy heating installation to be shut down entirely. With the present invention, this may be done easily and quickly by swinging the reflector into place so that it covers the face of the collector.

It is to be understood that the embodiments herein shown and described are by way of illustration and not of limitation, and that various other embodiments may be made without departing from the spirit or scope of this invention.

I claim:

1. A method of optimizing energy collection by radiant energy collection apparatus which includes a collector device and an associated reflector device which is pivotally moveable with respect to the region of the lower edge of said collector device, comprising the steps of positionally fixing said collector at a desired angle with respect to a chosen angle of incidence of the radiant energy to be collected, such that the effectiveness of said collector is optimized over a selected time span said time span being not greater than a solar year, positioning said reflector at a first angle with respect to said collector to maximize the vertical aperture effectuated by them, so as to cause said reflector to reflect a desired amount of the energy impinging thereon onto said collector over the said selected time span, and subsequently angularly re-positioning said reflector to a second angle with respect to said collector by pivotally moving it with respect to said collector so as to cause said reflector to reflect a desired amount of the energy reflected therefrom onto said collector over a second selected time span which is not greater than a solar year and which is different from said first time span.

2. A method of optimizing energy collection by solar collection apparatus which includes a collector device and an associated reflector device which is pivotally moveable with respect to the lower edge of said collector device comprising the steps of selecting a first sun ray angle ($S_1$) with respect to horizontal for a first selected seasonal time span which is less than a full solar year, establishing the angular disposition (d) between the first sun ray angle ($S_1$) and the collector normal which will provide the maximum vertical aperture (A) for said collector and said reflector, establishing an interior angle (b) between said collector and said reflector when they are positioned with respect to each other so as to effect said maximum vertical aperture, selecting a second sun ray angle ($S_2$) with respect to horizontal for a second seasonal time span which is different from said first seasonal time span, and establishing an angle (a) between said second sun ray angle and said reflector at which the maximum amount of radiant energy will be reflected by said reflector to said collector for the period of said second seasonal time span without alteration of the angular disposition of said collector with respect to horizontal.

3. The method described in claim 2 including the steps of positioning said collector at said angular disposition (d) with respect to said first sun ray angle ($S_1$); and positioning said reflector with respect to said collector at said interior angle (b).

4. The method described in claim 3 including the step of positioning said reflector at said second angle (a) with respect to said second sun angle ($S_2$).

5. The method described in claims 2, 3 or 4 wherein the step of establishing the angular disposition (d) between the first sun ray angle ($S_1$) and the collector normal to provide the maximum vertical aperture (A) of said collector and said reflector comprises selecting a value for the angular disposition (d) therebetween which yields the maximum value for the vertical aperture (A), substantially according to the following formula:

$$A = RL \sin\left[\left(d\left(1 - \frac{\frac{L}{H}+1}{\frac{L}{H}+2}\right) + 90\left(\frac{\frac{L}{H}+3}{\frac{L}{H}+2}\right) - 90\right)\right] + H \cos d$$

wherein
- A = Vertical aperture of collector and reflector, corrected for reflector reflectivity
- R = Reflector reflectivity
- L = Length of Reflector
- d = angle of incidence of selected sun ray to collector surface, measured from the collector normal
- H = Vertical height of collector.

6. The method described in claims 2, 3 or 4 wherein said step of establishing said first interior angle (b) between said collector and said reflector is substantially in accordance with the formula $$b = -\left[\frac{\frac{L}{H}+1}{\frac{L}{H}+2}\right] d + 90 \left[\frac{\frac{L}{H}+3}{\frac{L}{H}+2}\right]$$

wherein
- b = Interior angle between collector and reflector
- d = Angle of incidence of selected sun ray to collector surface, measured from the collector normal
- L = Length of Reflector
- H = Vertical height of collector.

7. The method described in claims 2, 3, or 4 wherein said step of establishing said second angle (a) is substantially in accordance with the formula $$H \sin [G+S_2-2a] = L \sin a$$

wherein
- H = Vertical height of collector
- G = Collector angle with the horizontal
- L = Length of Reflector
- a = Angle between sun ray, S, and reflector surface
- $S_2$ = said second sun ray angle for said second seasonal time span.

8. The method described in claims 2, 3, or 4 wherein said step of establishing said first interior angle (b) between said collector and said reflector is substantially in accordance with the formula $$b = -\left[\frac{\frac{L}{H}+1}{\frac{L}{H}+2}\right] d + 90 \left[\frac{\frac{L}{H}+3}{\frac{L}{H}+2}\right]$$

and wherein said step of establishing said second angle (a) is substantially in accordance with the formula $$H \sin [G+S_2-2a] = L \sin a$$

wherein
- b = Interior angle between collector and reflector
- d = Angle of incidence of selected sun ray to collector surface, measured from the collector normal
- L = Length of Reflector
- H = Vertical height of collector
- G = Collector angle with the horizontal
- a = Angle between sun ray, S, and reflector surface
- $S_2$ = said second sun ray angle for said second seasonal time span.

9. The method described in claim 2 wherein the step of establishing the angular disposition (d) between the first sun ray angle ($S_1$) and the collector normal to provide the maximum vertical aperture (A) of said collector and said reflector comprises selecting a value for the angular disposition (d) therebetween which yields the maximum value for the vertical aperture (A), substantially according to the following formula:

$$A = RL \sin\left[\left(d\left(1 - \frac{\frac{L}{H}+1}{\frac{L}{H}+2}\right) + 90\left(\frac{\frac{L}{H}+3}{\frac{L}{H}+2}\right) - 90\right)\right] + H \cos d$$

and wherein said step of establishing said first interior angle (b) between said collector and said reflector is substantially in accordance with the formula $$b = -\left[\frac{\frac{L}{H}+1}{\frac{L}{H}+2}\right] d + 90 \left[\frac{\frac{L}{H}+3}{\frac{L}{H}+2}\right]$$

and wherein said step of establishing said second angle (a) is substantially in accordance with the formula $$H \sin [G+S_2-2a] = L \sin a$$

wherein
- b = Interior angle between collector and reflector
- d = Angle of incidence of selected sun ray to collector surface, measured from the collector normal
- L = Length of Reflector
- H = Vertical height of collector
- G = Collector angle with the horizontal
- a = Angle between sun ray, S, and reflector surface
- $S_2$ = said second sun ray angle for said second seasonal time span
- A = Vertical aperture of collector and reflector, corrected for reflector reflectivity
- R = Reflector reflectivity.

10. Apparatus for the collection of solar energy comprising collector means for collecting solar energy while being fixedly positioned with respect to a design sun ray selected for a selected portion of the solar year which is less than the full solar year in length, a reflector, one edge of which is juxtaposed to one edge of said collector, said reflector being pivotally moveable with respect to said collector about said juxtaposed edge, and means to fix said reflector at more than one selected position among the positions into which said reflector is pivotally moveable with respect to said collector, the angle (d) at which said collector is fixed with respect to said design sun ray being at that value which produces the greatest vertical aperture (A) being substantially in accordance with the following formula $$A = RL \sin\left[d\left(1 - \frac{\frac{L}{H}+1}{\frac{L}{H}+2}\right) + 90\left(\frac{\frac{L}{H}+3}{\frac{L}{H}+2}\right) - 90\right] + H\cos d$$

wherein
A = Vertical aperture of collector and reflector, corrected for reflector reflectivity
R = Reflector reflectivity
L = Length of Reflector
d = Angle of incidence of selected sun ray to collector surface, measured from the collector normal
H = Vertical height of collector the first among said selected positions at which said reflector is fixed with respect to said collector at an angle (b) substantially in accordance with the following formula $$b = 90\left[\frac{\frac{L}{H}+3}{\frac{L}{H}+2}\right] - d\left[\frac{\frac{L}{H}+1}{\frac{L}{H}+2}\right]$$

wherein
L = Length of Reflector
H = Vertical height of collector
b = Interior angle between collector and reflector
d = Angle of incidence of selected sun ray to collector surface, measured from the collector normal and other among said selected positions each being at an angle (a) which is substantially in accordance with the following formula $$H \sin[G+S_n-2a]=L \sin a$$

wherein
H = Vertical height of collector
G = Collector angle with the horizontal
$S_n$ = the selected sun ray angle for a different seasonal time span
a = Angle between sun ray, S, and reflector surface
L = Length of Reflector.

* * * * *